(12) United States Patent
Kaku et al.

(10) Patent No.: US 11,388,133 B2
(45) Date of Patent: Jul. 12, 2022

(54) NETWORK SWITCH

(71) Applicant: DENSO CORPORATION, Kariya (JP)

(72) Inventors: Yoshifumi Kaku, Kariya (JP); Taichi Itagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 281 days.

(21) Appl. No.: 16/669,737

(22) Filed: Oct. 31, 2019

(65) Prior Publication Data

US 2020/0153783 A1    May 14, 2020

(30) Foreign Application Priority Data

Nov. 13, 2018 (JP) .............................. JP2018-212857

(51) Int. Cl.
| | |
|---|---|
| *H04L 61/10* | (2022.01) |
| *H04L 45/745* | (2022.01) |
| *H04L 49/25* | (2022.01) |
| *H04L 61/5007* | (2022.01) |
| *H04L 101/622* | (2022.01) |

(52) U.S. Cl.
CPC ............ *H04L 61/10* (2013.01); *H04L 45/745* (2013.01); *H04L 49/25* (2013.01); *H04L 61/2007* (2013.01); *H04L 61/6022* (2013.01)

(58) Field of Classification Search
CPC . H04L 61/10; H04L 61/2007; H04L 61/6022; H04L 45/745; H04L 49/25
See application file for complete search history.

(56) References Cited

U.S. PATENT DOCUMENTS

| | | | | |
|---|---|---|---|---|
| 9,319,317 | B1 * | 4/2016 | Spadaro | ................ H04L 45/745 |
| 2008/0247395 | A1 * | 10/2008 | Hazard | ................ H04L 45/00 |
| | | | | 370/392 |
| 2013/0242983 | A1 * | 9/2013 | Tripathi | ................ H04L 47/10 |
| | | | | 370/355 |

(Continued)

FOREIGN PATENT DOCUMENTS

| | | |
|---|---|---|
| JP | H09-214550 A | 8/1997 |
| JP | 2011-193401 A | 9/2011 |

(Continued)

OTHER PUBLICATIONS

Windows 2000 standard tool complete master, Windows 2000 magazine No. 4, p. 114, Feb. 1, 2001 (and partial translation).

(Continued)

*Primary Examiner* — Elton Williams
(74) *Attorney, Agent, or Firm* — Posz Law Group, PLC

(57) ABSTRACT

A network switch includes: a table record portion that records an address solution table that records multiple address information; an information addition portion that adds new address information for a new communication device based on the address solution data to the address information table; a relay portion that relays data other than the address solution data; and a rewrite portion that rewrites at least one of the address solution table or propriety information in accordance with an external instruction output from an external device. The address solution table includes the propriety information indicating availability propriety of the address information for each of the multiple address information. The relay portion relays the data by utilizing the address information set to be utilizable in the propriety information.

14 Claims, 4 Drawing Sheets

ARP TABLE

| # | S/D | Valid | IP Addr | MAC Addr | |
|---|---|---|---|---|---|
| 0 | S | enable | 192.168.10.10 | MAC2 | |
| 1 | D | disable | 192.168.10.20 | MAC1 | A |
| 2 | | | | | |

(56) References Cited

U.S. PATENT DOCUMENTS

2017/0264555 A1* 9/2017 Yonezu .................. H04L 45/745
2019/0065229 A1* 2/2019 Tsirkin ................ G06F 9/45558

FOREIGN PATENT DOCUMENTS

| JP | 2015-146488 A | 8/2015 |
| JP | 2016-025478 A | 2/2016 |
| JP | 2018-061148 A | 4/2018 |

OTHER PUBLICATIONS

Office Action dated Jan. 25, 2022 cited in the counterpart foreign application No. JP2018-212857 filed Nov. 13, 2018 (no copy attached).

\* cited by examiner

FIG. 2

ARP TABLE

| # | S/D | Valid | IP Addr | MAC Addr | |
|---|-----|---------|---------------|----------|---|
| 0 | S | enable | 192.168.10.10 | MAC2 | |
| 1 | D | disable | 192.168.10.20 | MAC1 | ~A |
| 2 | | | | | |

FIG. 3

ENTRY UPDATE STATUS  ~B

| # | 0 | 1 | 2 | 3 | 4 | ... |
|--------|---|---|---|---|---|-----|
| Update | 0 | 1 | 0 | 0 | 0 | ... |

NETWORK SWITCH

CROSS REFERENCE TO RELATED APPLICATION

The present application claims the benefit of priority from Japanese Patent Application No. 2018-212857 filed on Nov. 13, 2018. The entire disclosure of the above application is incorporated herein by reference.

TECHNICAL FIELD

The present disclosure relates to a network switch that relays data between multiple communication devices.

BACKGROUND

A network switch that is applicable to ARP (Address Resolution Protocol) has been known. The ARP is a protocol for searching a MAC address based on an IP address. The network switch includes an ARP table describing a relation between the IP address and the MAC that are recognized by the ARP. As a comparative example, a technique for implementing, by a software process of a CPU, a function of relaying data, a function of the ARP, and a function of rewriting the ARP table is proposed.

SUMMARY

One example embodiment of the present disclosure simplifies a configuration of a network switch that relays data between multiple communication devices.

According to one example embodiment, a network switch may be connected to multiple communication lines and may relay data between the multiple communication lines. The network switch may include a table record portion, an information addition portion, a relay portion, and a rewrite portion.

The table record portion may record an address solution table that records multiple address information for mutually identifying each of the communication devices by multiple protocols. The information addition portion may add the new address information for a new communication device to the address information table.

The relay portion may relay the data other than the address solution data. The address solution table may include the propriety information indicating availability propriety of the address information.

The relay portion may relay the data by utilizing the address information set to be utilizable in the propriety information. The rewrite portion may rewrite the propriety information.

BRIEF DESCRIPTION OF DRAWINGS

The above and other objects, features and advantages of the present disclosure will become more apparent from the following detailed description made with reference to the accompanying drawings. In the drawings:

FIG. 2 is an explanatory diagram showing an example of an ARP table;

FIG. 3 is an explanatory diagram showing an example of an entry update status;

DETAILED DESCRIPTION

Figure 1:
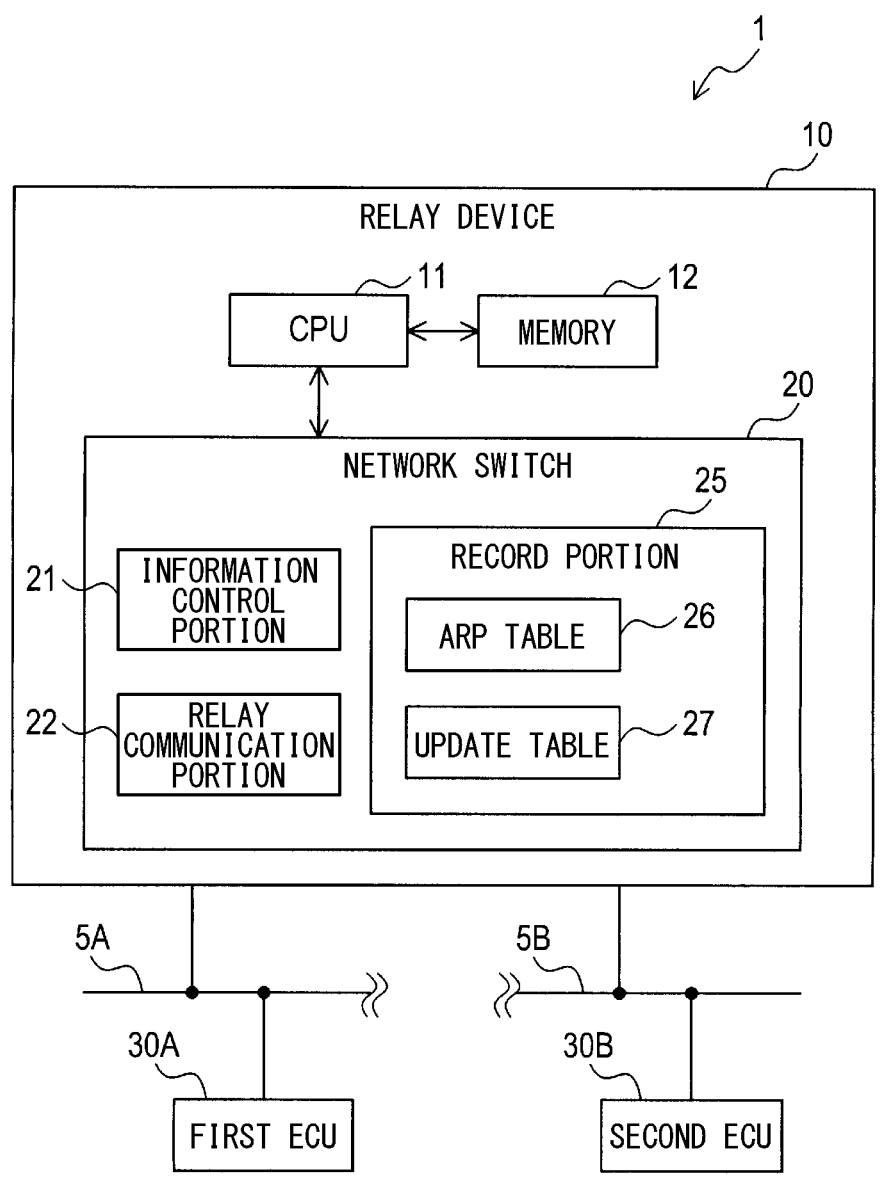
FIG. 1 is a block diagram showing a configuration of a communication system.

As a result of detailed studies by the inventors, it is found that the network switch in the comparative example described above has a complex configuration while the network switch has a high function, and thereby the network switch becomes expensive. For example, when the network switch is implemented by a hardware, it is required that the configuration of the network switch is simplified.

One example embodiment of the present disclosure simplifies a configuration of a network switch that relays data between multiple communication devices.

According to one example embodiment, a network switch may be connected to multiple communication lines and may relay data between the multiple communication lines. The network switch may include a table record portion, an information addition portion, a relay portion, and a rewrite portion.

The table record portion, for each of communication devices connected to the multiple communication lines, may record an address solution table that records multiple address information mutually for identifying each of the communication devices by multiple protocols. The information addition portion may add new address information for a new communication device based on the address solution data to the address information table, when receiving the address solution data having a preset format for the new communication device in a case where the new address information for the new communication device is not recorded in the address solution table.

The relay portion may relay the data other than the address solution data by utilizing the address solution table when receiving the data. The address solution table may include the propriety information indicating availability propriety of the address information for each of the multiple address information.

The relay portion may relay the data by utilizing the address information set to be utilizable in the propriety information. The rewrite portion may rewrite the propriety information in accordance with an external instruction output from an external device positioned outside the network switch to the network switch.

According to the configuration, it may be possible to rewrite the propriety information in accordance with the external instruction. Therefore, it may be possible to relegate the determination of the availability propriety of the address information to the external device that transmits the external instruction. That is, it may be possible to place, at least, a part of a function of rewriting the ARP table outside the network switch. Accordingly, the network switch does not need to include the configuration for determining the availability propriety of the address information. Therefore, it may be possible to simplify the configuration of the network switch. It may be possible to manufacture at a lower cost when the network switch is implemented by the hardware.

[1. Overview]

As a network switch that relays data between multiple communication devices, there is a network switch performing communication while performing address solution between multiple protocols. When Ethernet (registered trademark) and Internet Protocol (IP) are utilized as the multiple protocols, a communication partner is identified based on an ARP table solving a combination of a MAC address and an IP address in an IP network. A layer 3 switching such as an Ethernet switch having a function of relaying the data in the IP network similarly needs to have the ARP table.

Here, a relation between the MAC address and the IP address for each communication device may be defined as address information. Each record area for writing the address information in the ARP table may be defined as an entry. In the ARP table, the address information that is statically set by a user and is not updated and the address information that is dynamically updated by ARP exchange are recorded in each of the entries.

An address of a transmission source is recorded in the dynamic address information by learning when any ARP frame is received. In this learning, the address information is added to the predetermined entry in the ARP table. However, an attack such as ARP spoofing, the dynamic information added by increase of the number of connected communication devices, or the like may cause overflow of a record capacity of the entry in the ARP table.

Therefore, in the ARP table, it is necessary to control aging of the entry or the like while preventing the static entry from being overwritten. However, the network switch is expensive when the network switch has the complicated configuration. Particularly, it may be preferable to control to rewrite the ARP table by an external device such as a CPU in viewpoint of security or the like.

The network switch in the present embodiment described below has update status information, and each of the entries in the ARP table has a Valid field. When the Valid is in a disabled state, the entry is invalid, that is, is not utilized. The network switch learns, in a state where the Valid is in the disabled state, the dynamic address information when receiving the ARP frame. The network switch notifies the CPU that the learning is performed.

The CPU receiving the notification checks the update status information, confirms which entry has been learned, and reads the address information regarding the updated entry. After that, the CPU determines whether the entry is valid or invalid. When the entry is changeable to be valid, the CPU rewrites the state of the Valid to an enabled state. In such a configuration, a management function such as the aging of the entry may be implemented by software of the CPU.

The network switch in the present embodiment protects the valid entry by overwriting the entry in which the Valid is in the disabled state at the overflow of the record capacity. The network switch in the present embodiment includes the configuration of adding a field indicating the dynamic state or the static state to the ARP table and overwriting the only entry in which the dynamic address information is recorded. Details of such a configuration will be described below.

(2. Embodiment)

Hereinafter, an embodiment of the present disclosure will be described with reference to the drawings.

[2-1. Configuration]

A communication system 1 is, for example, a system that is mounted on a vehicle such as a passenger car and performs communication between each of the communication devices in the vehicle. The communication system 1 shown in FIG. 1 includes a relay device 10, a first ECU 30A, and a second ECU 30B. The relay device 10 includes a CPU 11, a memory 12, and a network switch 20. The CPU 11 and the network switch 20 are connected by a physical cable.

The network switch 20 is configured as a layer 3 switching that utilizes Ethernet (registered trademark) and Internet Protocol. The network switch 20 are connected to multiple communication lines 5A and 5B, and relays data between the multiple communication lines 5A and 5B. In the present embodiment, the communication line 5A is connected to the first ECU 30A. The communication line 5B is connected to the second ECU 30B. The first ECU 30A and the second ECU 30B are configured as communication devices communicating from each other via the communication lines 5A and 5B and the relay device 10.

The network switch 20 is configured as, for example, a hardware including a circuit such as FPGA. The network switch 20 includes an information control portion 21, a relay communication portion 22, and a record portion 25.

The information control portion 21 performs reading, writing, or the like of the address information to an ARP table 26 by executing most of switch processes described later. The relay communication portion 22 executes a process of relaying a normal frame representing the data other than the ARP frame in accordance with the ARP table 26 by executing a process in S260 of the switch process described later.

The record portion 25 records the ARP table 26 and an update table 27. The ARP table 26 includes the individual entries discriminated by unique numbers described in the "#" columns, as shown in FIG. 2. The entries indicate each of the record areas for describing the address information.

The individual entries are able to record the address information. The address information corresponds to information for mutually identifying the individual communication devices by the multiple protocols for each of the communication devices such as the ECUs 30A and 30B. The address information includes the IP address (IP Adder) of the communication device and the MAC address (MAC Adder) of the communication device. The address information is utilized for the address solution of the ARP.

Each of the entries is configured to record static-dynamic information (S/D; Static/Dynamic) indicating whether each of the entries is dynamic or static and propriety information (Valid) indicating the availability propriety of the entry. The static-dynamic information is set to a state of "Dynamic" when the IP address in accordance with the MAC address of the communication device is dynamically changed. The static-dynamic information is set to a state of "Static" when the IP address in accordance with the MAC address of the communication device is not changed. The state of "Dynamic" may be also referred to as a Dynamic state. The state of "Static" may be also referred to as a static state. The propriety information is set to a state of "disable" when the entry is not utilizable. The propriety information is set to a state of "enable" when the entry is utilizable. The state of "disable" may be also referred to as a disabled state. The state of "enable" may be referred to as an enabled state.

The update table 27 is a table for identifying the entry in which the added address information is recorded when the address information is added to the ARP table 26. In the update table 27, as shown in FIG. 3, the individual entries discriminated by "#" and the update status information indicating whether the entry is updated are correlated and recorded. In the present embodiment, an update flag in an Update column may be employed as the update status information. The update flag is set to 1 for the updated entry. The update flag is set to 0 for the non-updated entry. The ARP table 26 and the update table 27 are readable and rewritable by the CPU 11.

In the relay device 10, the CPU 11 and the memory 12 configure a microcomputer. The memory 12 is configured as, for example, a semiconductor memory such as a RAM or a ROM. In the relay device 10, each of the functions of rewriting the ARP table 26 and the update table 27 by the CPU 11 may be implemented by the CPU 11 executing a program stored in a non-transitory tangible storage medium.

In this example, the memory 12 corresponds to the non-transitory tangible storage medium storing the program. By executing this program, a method in accordance with the program is performed. The non-transitory tangible storage medium means a record medium excluding electromagnetic waves. The relay device 10 may include one microcomputer or multiple microcomputers.

The present embodiment exemplifies a case where the number of communication lines connected to the relay device 10 is two and the number of communication devices performing communication via the relay device 10 is two. However, the number of communication lines and the number of communication devices may be three or more.

[2-2. Process]

Figure 4:
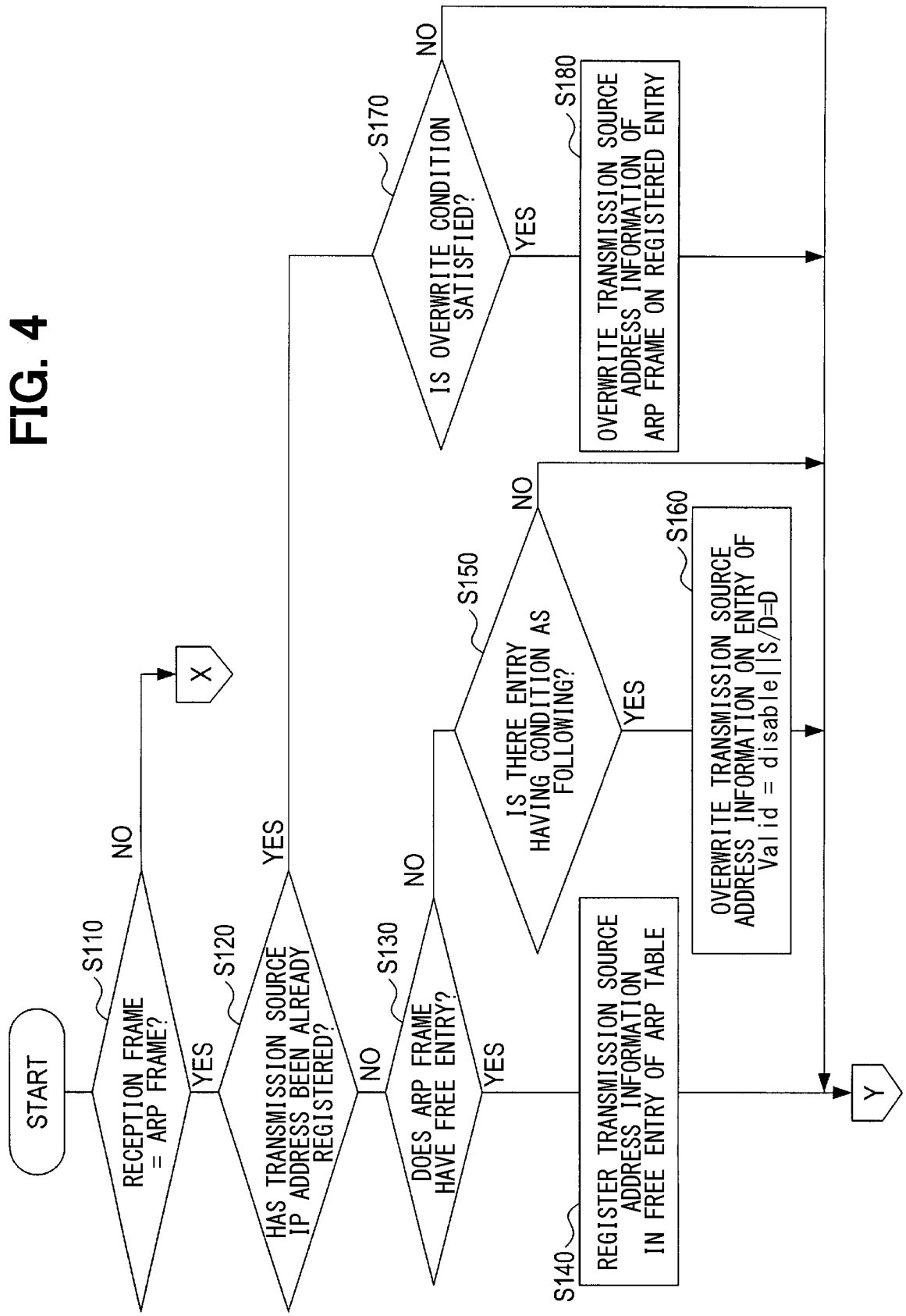
FIG. 4 is a flowchart (part 1) of a switch process.
Figure 5:
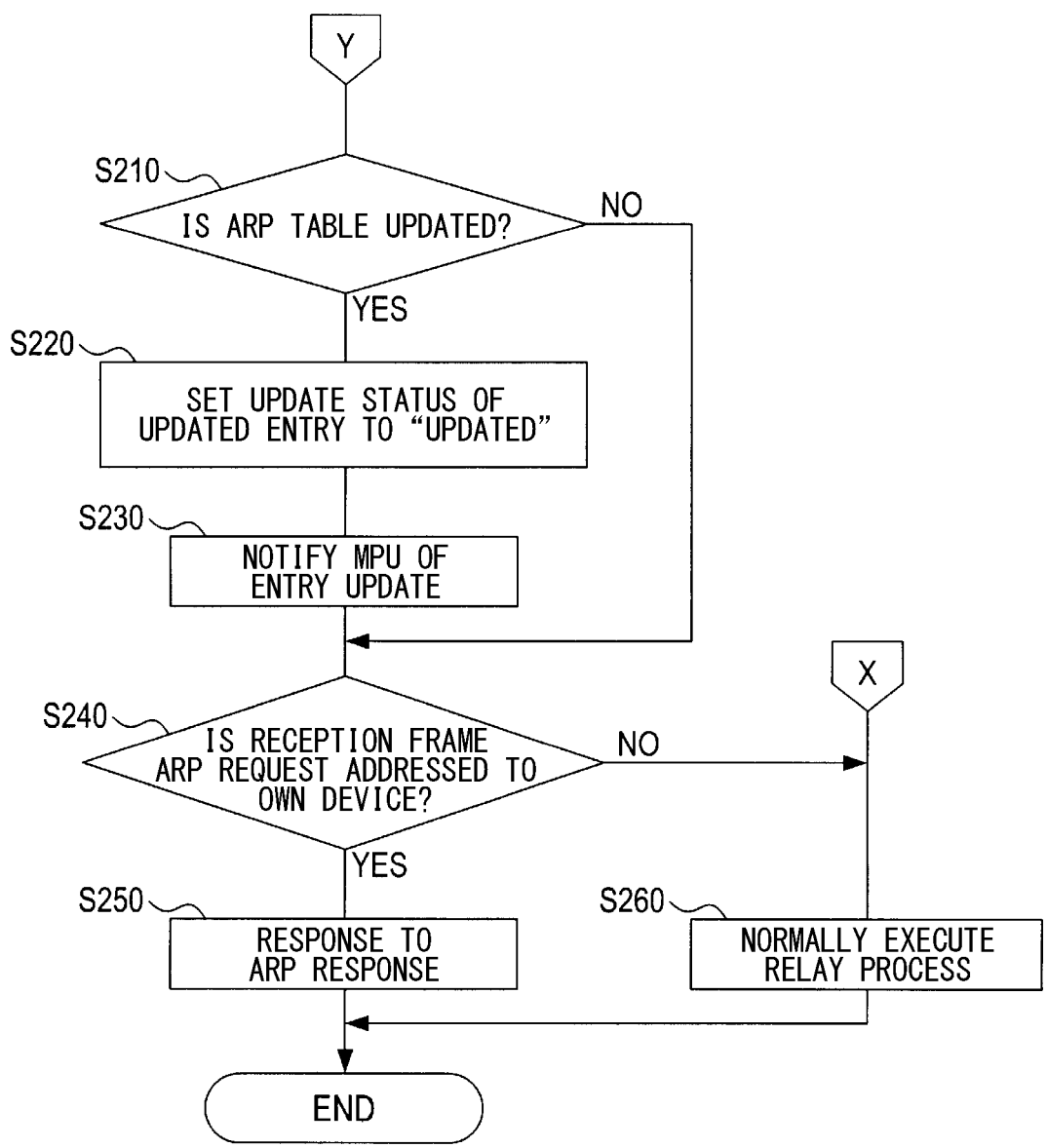
FIG. 5 is a flowchart (part 2) of the switch process.

The switch process executed by the network switch 20 will be described with reference to flowcharts of FIG. 4 and FIG. 5. The switch process starts when the network switch 20 receives any frame from the connected communication lines 5A and 5B. The frame corresponds to general data including actual data and a header in accordance with a predetermined protocol.

In the switch process, first, the network switch 20 determines whether the received frame is the ARP frame in S110. The ARP frame corresponds to address solution data in the present disclosure. The ARP frame includes an ARP request requesting the MAC address based on the IP address and an ARP response that is a response to the ARP request and has the IP address and the MAC address.

Each of the ARP frames can be discriminated from another frame by decoding the header of the frame. The network switch 20 has a function of returning the ARP response to the ARP request as shown in S240 and S250 described later.

In S110, when the network switch 20 determines that the received frame is not the ARP frame, the process shifts to S260 described later. The received frame may be also referred to as a reception frame. When the network switch 20 determines that the received frame is the ARP frame in S110, the process shifts to S120. The network switch 20 determines whether a transmission source IP address of the ARP frame has been already registered in the ARP table 26.

When the network switch 20 determines that the transmission source IP address has been not registered in the ARP table 26 in S120, the process shifts to S130. The network switch 20 determines whether there is a free entry in the ARP table 26. The free entry indicates an entry in which the address information is not registered among the multiple entries in the ARP table 26.

When the network switch 20 determines that there is a free entry in the ARP table 26 in S130, the process shifts to S140. The address information regarding the transmission source of the ARP frame is registered in the free entry of the ARP table 26. For example, in the ARP table 26 shown in FIG. 2, when an entry #1 and an entry #2 are free, the address information is registered in the entry #1 having a small value (may be also referred to as a small number) as shown in a part A of FIG. 2. Then, the Valid is set to the disabled state, and the S/D is set to the Dynamic state. Thereafter, the process shifts to S210 described later.

By contrast, when the network switch 20 determines that there is not the free entry in the ARP table 26 in S130, the process shifts to S150. The network switch 20 determines whether the entry in which the Valid is set to the disabled state or the S/D is set to the Dynamic state exists in the ARP table 26.

When the network switch 20 determines that the entry in which the Valid is set to the disabled state or the S/D is set to the Dynamic state exists in the ARP table 26 in S150, the process shifts to S160. The address information of the transmission source of the ARP frame is overwritten on the entry in which the Valid is set to the disabled state or the S/D is set to the Dynamic state. In this case, the network switch 20 may overwrite the address information on an entry in which the most time has lapsed since after the registration, or may preferentially overwrite on the entry which the Valid is set to the disabled state and also the S/D is set to the Dynamic state.

Here, the entry in which the propriety information is not utilizable, that is, the Valid is set to the disabled state may cause a difficulty in a device when frequency of the use is low or the entry is utilized. Even when the entry is deleted, the difficulty is not caused often. The network switch 20 overwrites the entry in which the propriety information is set to be not utilizable with a new entry. The entry in which the static-dynamic information is dynamically set, that is, the S/D is set to the Dynamic state changes as a time elapses compared to the entry in which the static-dynamic information is statically set. Therefore, a possibility of being not utilizable may be high. The network switch 20 overwrites the entry in which the static-dynamic information is dynamically set with the new entry.

When the network switch 20 determines that there is not the entry in which the Valid is set to the disabled state or the S/D is set to the Dynamic state in the ARP table 26 in S150, the process shifts to S210 without updating the ARP table 26.

When the network switch 20 determines that the transmission source IP address of the ARP frame has been already registered in the ARP table 26 in S120, the process shifts to S170. The network switch 20 determines whether the registered entry in accordance with the transmission source IP address satisfies an overwrite condition. Here, the overwrite condition may mean that, in this entry, the Valid is set to the disabled state or the S/D is set to the Dynamic state and also the address information of this entry does not match the transmission source address information of the ARP frame.

A case where the address information does not match the transmission source address information corresponds to a situation where the transmission source IP address of the ARP frame matches the IP address recorded in the entry and the transmission source MAC address of the ARP frame does not match the MAC address recorded in the entry.

When the network switch 20 determines that the overwrite condition is satisfied in S170, the process shifts to S180. After the network switch 20 overwrites the transmission source address information of the ARP frame on the registered entry, the process shifts to S210. By contrast, when the network switch 20 determines that the overwrite condition is not satisfied in S170, the process shifts to S210.

In S210, the network switch 20 determines whether the ARP table 26 is updated. When the network S210 determines that the ARP table 26 is updated in S210, the process shifts to S220. The network switch 20 changes, for the updated entry, a status of the update status information in the update table 27 to a status that the entry has been updated. That is, the network switch 20 sets the update flag in accordance with the updated entry to 1. For example, when the entry #1 is updated, the update flag for the entry #1 is set to 1, as shown in FIG. 3B. In S230, the network switch 20 notifies the CPU 11 of the entry update, and the process shifts to S240.

Here, when receiving the notification from the network switch 20, the CPU 11 executes an interruption process. As details of the interruption process, for example, when receiving the notification of the entry update, the CPU 11 refers to the update table 27, and recognizes the entry in which the update flag is set to 1. The CPU 11 acquires the address information recorded in the updated entry in the ARP table 26.

The CPU 11 determines that the address information corresponds address information of a communication device described in a separately prepared black list or corresponds to address information of a communication device described in a separately prepared white list, or the like. The black list or the white list may be stored in the memory 12, or acquired from a server outside the vehicle or the like.

The CPU 11 determines whether the entry may be utilized in which the address information is recorded based on the determination described above. When determining that the entry may be utilized, the CPU 11 instructs the network switch 20 to rewrite the Valid to the enabled state. The information control portion 21 of the network switch 20 rewrites the Valid to the enabled state in accordance with an external instruction output from the CPU 11 corresponding to the external device to the network switch 20, that is, the instruction for rewriting the Valid to the enabled state. The CPU 11 may directly access the ARP table 26, and may rewrite the description content of the Valid or the like, for example.

By contrast, when the network switch 20 determines that the ARP table 26 is not updated in S210, the process shifts to S240. The network switch 20 determines whether the received ARP frame corresponds to the ARP request addressed to the own device.

When the network switch 20 determines that the request ARP frame corresponds to the ARP request addressed to the own device in S240, the process shifts to S250. The network switch 20 transmits the ARP response returning the MAC address to the transmission source in response to the ARP request, and ends the switch processes in FIG. 4 and FIG. 5.

By contrast, when the network switch 20 determines that the ARP frame received in S240 does not correspond to the ARP request addressed to the own device, the process shifts to S260. The network switch 20 executes a normal relay process. That is, the network switch 20 sets whether to relay the frame according to the ARP table 26. After relaying or discarding the frame according to the setting, the network switch 20 ends the switch process in FIG. 4 and FIG. 5. Then, the entry in which the Valid is set to the disabled state is regarded as not existing.

[2-3. Effects]

According to the embodiment detailed above, the following effects may be provided.

(2a) The network switch 20 described above is connected to the multiple communication lines 5A and 5B, and relays the data between the multiple communication lines 5A and 5B. The network switch 20 includes the record portion 25, the information control portion 21, and the relay communication portion 22.

The record portion 25 is able to record the ARP table 26. The ARP table 26 includes, for each of the ECUs 30A and 30B connected to the multiple communication lines 5A and 5B, multiple entries for mutually identifying the individual ECUs 30A and 30B by the multiple protocols. When the information control portion 21 receives the ARP frame having a preset format for the new ECUs 30A and 30B in which the entry is not recorded in the ARP table 26 in S140, S160, and S180, the information control portion 21 adds the entry for the new ECUs 30A and 30B based on the ARP frame to the ARP table 26.

When receiving the data other than the ARP frame, the relay communication portion 22 relays the data by utilizing the ARP table 26 in S260. The ARP table 26 includes, for each of multiple entries, the propriety information indicating the availability propriety of the entry.

The relay communication portion 22 relays the data by utilizing the entry set to be utilizable in the propriety information in S260. The information control portion 21 rewrites the ARP table 26 or the propriety information in accordance with the external instruction output from the CPU 11 corresponding to the external device to the network switch 20.

According to the configuration, it may be possible to rewrite the propriety information in accordance with the external instruction. Therefore, it may be possible to relegate the determination of the availability propriety of the entry to the external device that transmits the external instruction. Accordingly, it is unnecessary to place the configuration for determining the availability propriety of the entry inside the network switch 20. Therefore, it may be possible to simplify the configuration of the network switch 20. It may be possible to manufacture at a lower cost when the network switch 20 is implemented by the hardware.

(2b) The information control portion 21 sets the propriety information for the entry to be not utilizable when adding the new address information to the ARP table 26 in S140, S160, and S180.

According to the configuration, the entry in which the new address information is recorded is not immediately set to be not utilizable. Therefore, it may be possible to prevent inconvenience caused by the immediate relay of the data based on the new address information. For example, it may be possible to prevent malicious data such as a program destroying the data from being relayed. When the external device is able to utilize the propriety information by the external instruction after examining the new address information, it may be possible to more safely add the address information to the ARP table 26.

(2c) The relay communication portion 22 performs the notification to the CPU 11 corresponding to the external device in S230 when the new address information is added to the ARP table 26. According to the configuration, it may be possible to cause the external device to recognize earlier that the address information is added to the ARP table 26. Therefore, it may be possible to shorten the time until the external device changes the propriety information.

(2d) The information control portion 21 overwrites the entry in which the propriety information is set to be not utilizable with the entry for the new ECUs 30A and 30B in S140, S160, and S180, when the free capacity of the record portion 25 is less than a preset setting capacity or when receiving the ARP frame for facilitating the update of the address information recorded in the ARP table 26.

According to the configuration, even when the free capacity of the record portion 25 is less than the preset setting capacity, it may be possible to prevent the data relay from being interrupted and record the new address information in the record portion 25.

(2e) The ARP table 26 includes the static-dynamic information indicating whether, for each of the multiple entries, the entry is dynamic or static. The information control portion 21 overwrites the entry in which the static-dynamic information is dynamically set with the new address information in S140, S160, and S180, when the free capacity of the record portion 25 is less than the preset setting capacity or when receiving the ARP frame for facilitating the update of the address information recorded in the ARP table 26.

According to the configuration, even when the free capacity of the record portion 25 is less than the preset setting capacity, it may be possible to prevent the data relay from being interrupted and record the new entry in the record portion 25.

(2f) The network switch 20 utilizes, as the multiple protocols, the Ethernet and the Internet Protocol. According to the configuration, when the layer 3 switching is employed as the network switch 20, it may be possible to operate the layer 3 switching satisfactorily.

(2e) The record portion 25 is able to record the update table 27 for identifying the entry added to the ARP table 26. The update table 27 is readable by the external device.

According to the configuration, the external device accesses the update table 27, and thereby it may be possible to cause the external device to recognize the entry added to the ARP table 26.

[3. Other Embodiments]

While the embodiment of the present disclosure have been described, the present disclosure is not limited to the embodiment described above and can be modified in various manners.

(3a) In the embodiment described above, the network switch 20 rewrites the ARP table 26 in accordance with the instruction from the CPU 11 as the external device. However, it is not limited to this. For example, the network switch 20 may be communicable with the server connected via the communication lines the external device, and may rewrite the ARP table 26 in accordance with the instruction from the server.

(3b) In the embodiment described above, the network switch 20 determines whether to overwrite the entry based on whether there is the free entry. However, it is not limited to this. For example, the network switch 20 may determine whether to overwrite the entry based on the amount of the free data in the record area, or the like.

(3c) Multiple functions of one element in the described above embodiment may be implemented by multiple elements, or one function of one element may be implemented by multiple elements. Further, multiple functions of multiple elements may be implemented by one element, or one function implemented by multiple elements may be implemented by one element. In addition, a part of the configuration of the described above embodiment may be omitted. At least a part of the configuration of the described above embodiment may be added to or replaced with another configuration of the above embodiment.

(3c) In addition to the communication system 1 described above, the present disclosure may be implemented by various embodiments such as the devices such as the network switch 20 or the like configuring the communication system 1, a program for making the computer function as the devices, the non-transitory tangible storage medium such as the semiconductor memory in which the program is stored, or a data relay method.

[4. Correspondence Relation Between the Configuration of the Described Above Embodiment and the Configuration of the Present Disclosure]

The ECUs 30A and 30B in the described above embodiment correspond to the communication device in the present disclosure. The CPU 11 in the described above embodiment corresponds to the external device in the present disclosure. The information control portion 21 in the described above embodiment corresponds to a rewrite portion in the present disclosure. The record portion 25 in the described above embodiment corresponds to a table record portion and an update record portion in the present disclosure.

The ARP table 26 in the described above embodiment corresponds to an address solution table in the present disclosure. The update table 27 in the described above embodiment corresponds to update information in the present disclosure. The ARP frame in the described above embodiment corresponds to the address solution data in the present disclosure.

The processes in S140, S160, and S180 among the processes executed by the network switch 20 in the described above embodiment correspond to an information addition portion in the present disclosure. The process in S230 corresponds to a notification portion in the present disclosure. The process in S260 corresponds to a relay portion in the present disclosure.

It is noted that a flowchart or the process of the flowchart in the present disclosure includes multiple steps (also referred to as sections), each of which is represented, for instance, as S101. Further, each step can be divided into several sub-steps while several steps can be combined into a single step.

The invention claimed is:

1. A network switch connected to a plurality of communication lines and configured to relay data between the plurality of communication lines, the network switch comprising:
　a table record portion configured to, for each of communication devices connected to the plurality of communication lines, record an address solution table configured to record a plurality of address information for mutually identifying each of the communication devices by a plurality of protocols;
　an information addition portion configured to add new address information for a new communication device based on an address solution data to the address information table, when receiving the address solution data having a preset format for the new communication device in a case where the new address information for the new communication device is not recorded in the address solution table;
　a relay portion configured to relay the data other than the address solution data by utilizing the address solution table when receiving the data; and
　a rewrite portion configured to rewrite at least one of the address solution table or propriety information in accordance with an external instruction output from an external device positioned outside the network switch to the network switch,
wherein:
　the address solution table includes the propriety information indicating availability propriety of the address information for each of the plurality of address information;
　the relay portion relays the data by utilizing the address information set to be utilizable in the propriety information;
　the propriety information is set to "disable" when the data is not utilizable, and the propriety information is set to "enable" when the data is utilizable; and
　when a use frequency of the data is low or a use of the data causes a difficulty in a device, the propriety information of the data is set to "disable".

2. The network switch according to claim 1, wherein:
　when adding the address information for the new communication device to the address solution table, the information addition portion sets the propriety information for the corresponding address information to be not utilizable.

3. The network switch according to claim 1, further comprising:
a notification portion configured to notify the external device when the information addition portion adds the address information for the new communication device to the address solution table.

4. The network switch according to claim 1, wherein:
the information addition portion overwrites the address information in which the propriety information is set to be not utilizable with the address information for the new communication device, when a free capacity of the table record portion is less than a preset setting capacity or when receiving the address solution data for facilitating an update of the address information recorded in the address solution table.

5. The network switch according to claim 1, wherein:
the address information table includes static-dynamic information indicating whether the address information is dynamic or static for each of the plurality of address information; and
the information addition portion overwrites the address information in which the static-dynamic information is dynamically set with the address information for the new communication device, when a free capacity of the table record portion is less than a preset setting capacity or when receiving the address solution data for facilitating the update of the address information recorded in the address solution table.

6. The network switch according to claim 1, wherein:
as the plurality of protocols, Ethernet that is a registered trademark and Internet Protocol are utilized;
as the address solution table, an address resolution protocol (ARP) table is utilized; and
as the address solution data, an ARP frame is employed.

7. The network switch according to claim 1, further comprising:
an update record portion configured to record update information for identifying the address information added to the address solution table,
wherein:
the update information is readable by the external device.

8. A network switch connected to a plurality of communication lines and configured to relay data between the plurality of communication lines, the network switch comprising:
a table record circuit configured to, for each of communication devices connected to the plurality of communication lines, record an address solution table configured to record a plurality of address information for mutually identifying each of the communication devices by a plurality of protocols;
an information addition circuit configured to add new address information for a new communication device based on an address solution data to the address information table, when receiving the address solution data having a preset format for the new communication device in a case where the new address information for the new communication device is not recorded in the address solution table;
a relay circuit configured to relay the data other than the address solution data by utilizing the address solution table when receiving the data; and
a rewrite circuit configured to rewrite at least one of the address solution table or propriety information in accordance with an external instruction output from an external device positioned outside the corresponding network switch to the corresponding network switch,
wherein:
the address solution table includes the propriety information indicating availability propriety of the address information for each of the plurality of address information;
the relay circuit relays the data by utilizing the address information set to be utilizable in the propriety information;
the propriety information is set to "disable" when the data is not utilizable, and the propriety information is set to "enable" when the data is utilizable; and
when a use frequency of the data is low or a use of the data causes a difficulty in a device, the propriety information of the data is set to "disable".

9. The network switch according to claim 8, wherein:
when adding the address information for the new communication device to the address solution table, the information addition circuit sets the propriety information for the corresponding address information to be not utilizable.

10. The network switch according to claim 8, further comprising:
a notification circuit configured to notify the external device when the information addition circuit adds the address information for the new communication device to the address solution table.

11. The network switch according to claim 8, wherein:
the information addition circuit overwrites the address information in which the propriety information is set to be not utilizable with the address information for the new communication device, when a free capacity of the table record circuit is less than a preset setting capacity or when receiving the address solution data for facilitating an update of the address information recorded in the address solution table.

12. The network switch according to claim 8, wherein:
the address information table includes static-dynamic information indicating whether the address information is dynamic or static for each of the plurality of address information; and
the information addition circuit overwrites the address information in which the static-dynamic information is dynamically set with the address information for the new communication device, when a free capacity of the table record circuit is less than a preset setting capacity or when receiving the address solution data for facilitating the update of the address information recorded in the address solution table.

13. The network switch according to claim 8, wherein:
as the plurality of protocols, Ethernet that is a registered trademark and Internet Protocol are utilized;
as the address solution table, an address resolution protocol (ARP) table is utilized; and
as the address solution data, an ARP frame is employed.

14. The network switch according to claim 8, further comprising:
an update record circuit configured to record update information for identifying the address information added to the address solution table,
wherein:
the update information is readable by the external device.

* * * * *